United States Patent [19]

Yarbrough et al.

[11] Patent Number: 4,598,288

[45] Date of Patent: Jul. 1, 1986

[54] APPARATUS FOR CONTROLLING THE RECEPTION OF TRANSMITTED PROGRAMS

[75] Inventors: Charles J. Yarbrough, Kenwood; Alan F. Strachan, Santa Rosa; Joe Weisman, Kenwood, all of Calif.

[73] Assignee: Codart, Inc., Calif.

[21] Appl. No.: 563,878

[22] Filed: Dec. 20, 1983

Related U.S. Application Data

[63] Continuation of Ser. No. 274,932, Jun. 18, 1981, abandoned, which is a continuation-in-part of Ser. No. 30,436, Apr. 16, 1979, Pat. No. 4,305,101.

[51] Int. Cl.⁴ ............................................. G11B 15/18
[52] U.S. Cl. .................. 340/825.34; 360/69; 360/60; 178/22.08
[58] Field of Search ............ 360/60, 69, 15, 35.1; 358/122, 123, 117, 908, 86, 194.1; 455/26; 369/47, 84; 178/22.08; 340/825.34

[56] References Cited

U.S. PATENT DOCUMENTS

| | | | |
|---|---|---|---|
| 3,485,946 | 12/1969 | Jackson | 360/35.1 |
| 3,696,297 | 10/1972 | Otero | 455/26 |
| 3,984,637 | 10/1976 | Caudill | 340/825.34 |
| 4,305,101 | 12/1981 | Yarbrough | 360/69 |
| 4,325,078 | 4/1982 | Seaton | 358/117 |

OTHER PUBLICATIONS

Lucazeau, System of Radio Program Supply, Electron & APP Ind., No. 232, p. 50, 3/1/77.

*Primary Examiner*—Alan Faber
*Attorney, Agent, or Firm*—Townsend and Townsend

[57] ABSTRACT

A control system for use with recording apparatus enables the recording of programs simultaneously desired by a user and authorized by a program provider, typically a broadcaster. The broadcaster attaches a code signal to each program segment which the user's control system recognizes. The control system contains a second code indicative of a preselected program and of authorization to record the program. When the codes correspond the control system activates the user's recorder to record the desired program.

11 Claims, 5 Drawing Figures

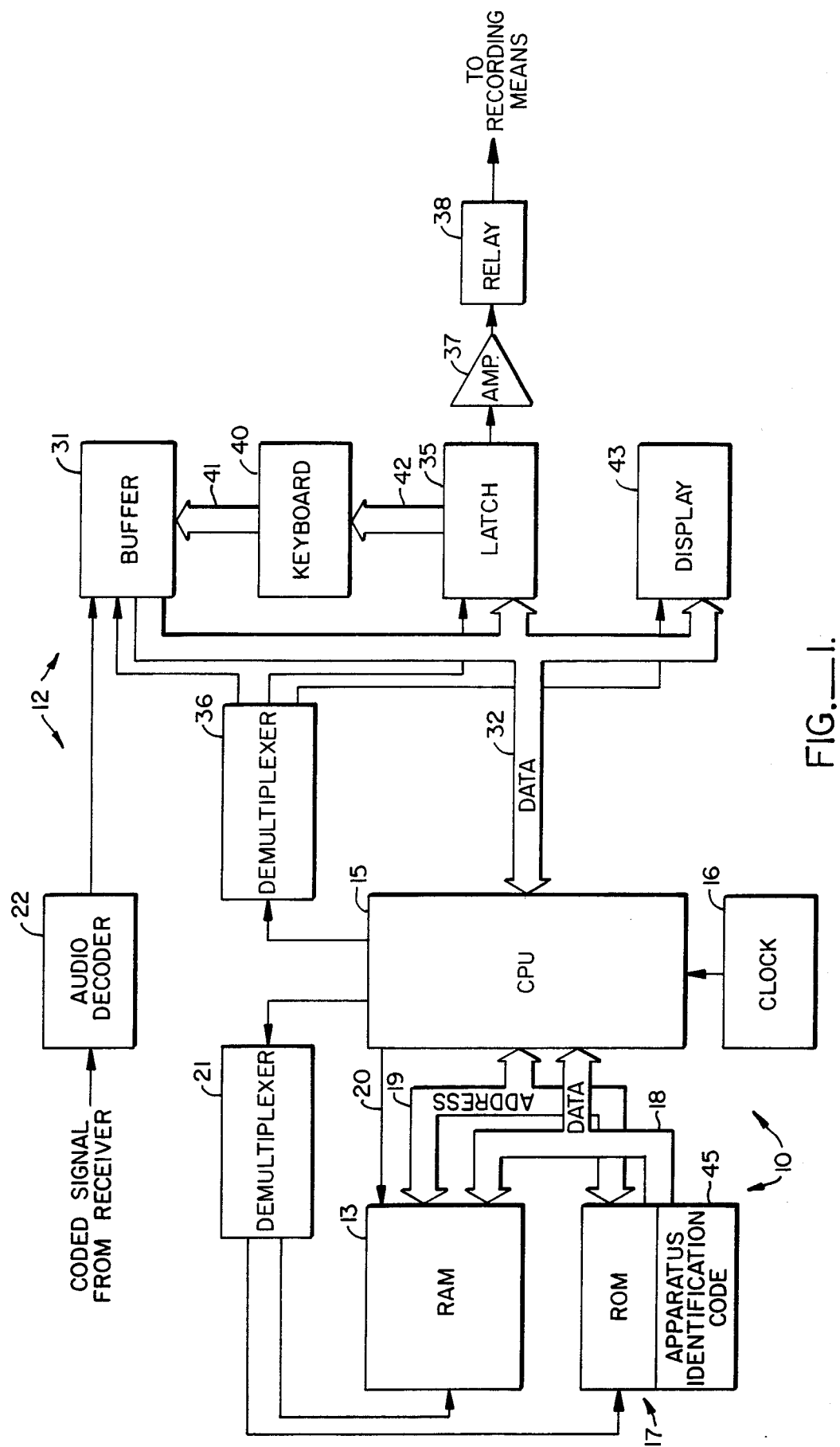
FIG._1.

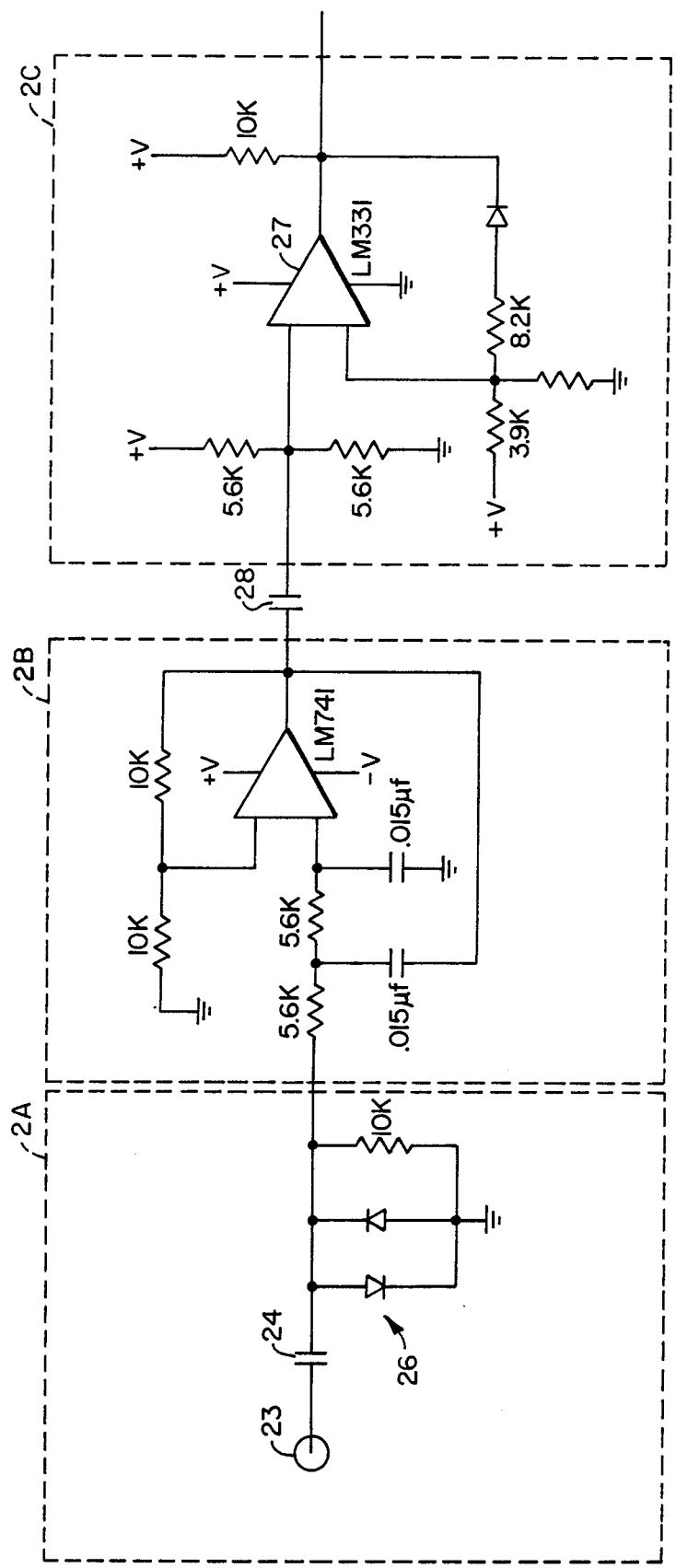
FIG._2.

APPARATUS FOR CONTROLLING THE RECEPTION OF TRANSMITTED PROGRAMS

CROSS REFERENCE TO RELATED APPLICATION

This is a continuation of application Ser. No. 274,932, filed 6/18/81, now abandoned, which is a continuation in part of our co-pending patent application, Ser. No. 06/030,436, filed Apr. 16, 1979, now U.S. Pat. No. 4,305,101.

BACKGROUND OF THE INVENTION

1. Field of the Invention

The invention relates to the automatic recording of radio programs, television programs and the like.

2. Description of the Prior Art

With the ready availability of high quality audio and video tape recorders, more and more consumers are recording their own libraries of television programs, films, music and the like. While such recording is desirable in that it provides each consumer with a collection of recorded programs tailored to his or her personal tastes, nevertheless two problems arise. First, a consumer generally likes to record only selected programs or portions of programs with commercials or other interruptions edited out. This generally requires that the consumer know in advance when a desired program will be transmitted, and that he or she be present at the time of the transmission, perched over the recording apparatus to edit out any undesired commercial breaks. Second, some programs are protected by the copyright laws, so can be legally recorded only with authorization from the copyright owner.

Attempts to solve the first problem have yielded devices for automatically switching a recorder on and off at the beginning and conclusion of a desired program. Such devices generally use one of two approaches. In the time-synchronized approach a device containing a clock can be set to turn the recording apparatus on and off at the scheduled start and end times of the desired program. In the program-triggered approach every transmitted program is accompanied by an identifying signal. An automatic switching device controlling the recorder is activated by this signal. The identification signal itself may consist merely of start and end codes transmitted at the beginning and end of the program, or it may be transmitted continuously throughout the program. To cause a desired program to be recorded in this type of device, the consumer enters a program code into a memory associated with the device, so that the device can recognize and respond to the transmitted program identification signal.

While both of these approaches provide suitable automatic actuation of a recorder, neither of these devices provides any protection for copyrighted programs. Indeed, for a program transmitted over the "free air wave," these devices facilitate copying, authorized or otherwise.

Some manner of protection for copyrighted works can be provided by subscription services. In these services programs are transmitted either over cable or, in a scrambled form, over the air. A subscriber receives either a cable hookup or a device for unscrambling the scrambled transmission. In this scheme the subscription fee can include the prorated royalty to be paid to the copyright owners whose material has been transmitted. Such a method has the obvious drawback that the subscriber pays a prorated royalty whether or not he or she records any programs. Furthermore, the scheme requires either a cable hookup, which is not uniformly available, or expensive and complicated apparatus for descrambling scrambled programs transmitted over the air.

SUMMARY OF THE INVENTION

The invention provides apparatus for automatically monitoring and controlling the recording or receiving of uncopyrighted and copyrighted or otherwise privileged programs. The apparatus is used in connection with electronic recording equipment and with means for receiving the transmitted programs. Programs transmitted with the intention of being monitored by the apparatus of the present invention are accompanied by a coded signal which identifies the programs and indicates whether they are copyrighted or otherwise privileged. The present invention enables a user to preselect desired programs for automatic recording at a later time, while providing protection against unauthorized recording of copyrighted or otherwise restricted programs. In particular, a user may preselect a mix of copyrighted and uncopyrighted programs, and the apparatus of the present invention will monitor the transmissions, automatically actuate recording means when a preselected uncopyrighted program is discovered, or actuate the recording means when a copyrighted program is discovered which the user has been given authorization to record. The apparatus will fail to actuate the recording means, even though a particular transmitted program has been preselected, when the user has not been given such authorization.

Broadly, control apparatus according to the present invention comprises code-sensing means for sensing a code accompanying a transmitted program, means for storing a code indicating a preselected program and further indicating authorization to record the program, and logic means connected to receive the sensed code and the stored code. The logic means provides a signal for enabling recording means when the sensed code, accompanying the transmitted program, and the stored code, indicating the program has been preselected, conjointly indicate the recording is authorized.

The apparatus of the present invention can be used for controlling the recording of broadcasts over commercial radio and television channels, as well as other types of programs, such as programs provided over cable networks or electronic newspapers transmitted to the home over telephone lines. In a preferred form of operation a transmitted program is accompanied by an audio-frequency coded transmission which identifies the program, either by name or generic type, and indicates whether the program is copyrighted. The code-sensing means of the invention then comprises an audio decoder, which recognizes the audio-frequency coded message admist the audio transmission.

The means for storing the code indicating the user's preselected programs is provided preferably by a random access memory in the form of a semiconductor memory. The user stores coded messages in this memory indicating the selected programs to be recorded and for copyrighted programs, further indicating authorization to record. A schedule of broadcasts, mailed weekly to the user, for example, can include the codes for the uncopyrighted programs. The codes for copyrighted programs, including an authorization code, can be provided in a separate schedule for users who pay a special subscription fee. Alternatively, a user might buy an individual authorization code for a particular program. However a user obtains and pays for a program code, he or she introduces it into the random access memory by means of a keyboard, light pen, or some other such access device.

The logic means is provided preferably by a microprocessor including a central processing unit and read only memory permanently containing instructions for controlling the central processing unit. The microprocessor compares the codes from the audio decoder with any code stored in the random access memory. If compatible program codes are found, and if in the case of copyrighted programs an authorization code is found, the microprocessor then provides a signal for actuating the recorder.

Another feature of the invention is the ability of the apparatus to challenge the authorization for any ongoing recording. In accordance with the present invention, the provider of the transmitted programs may transmit from time to time a special coded signal challenging authorization to record any particular program. When an authorization-challenging code is recognized by the code-sensing means, the microprocessor verifies that the random access memory contains a recording authorization code. If no such code is found in the random access memory, indicating the user has in some way actuated the recording means with no authorization to do so, the microprocessor then terminates the recorder-actuating signal or, alternatively, provides an override disabling signal to stop the recording.

As another feature of the invention the apparatus may include a permanently stored identification code unique to an individual apparatus or to a limited number of them and inaccessible to a user. With this embodiment of the invention a program code entered by the user for copyrighted or otherwise privileged programs may include not only the program identity and recording authorization, but also the coded identity of the individual apparatus which is to control the recording. The microprocessor compares the code received from the code-sensing means both with the contents of the random access memory and with the permanently stored apparatus identification code. Only when the combined comparison is favorable does the microprocessor provide an enabling signal for the recorder. In this manner, the invention protects against multiple recording by several users where only one user has been given authorization to record.

The present invention can be used to control the recording of programs provided by cable or other communications lines to a user who has paid for the service. When programs are broadcast over the air, however, they are generally available for anybody to record with or without the present invention. Nevertheless, the present invention can be applied to controlling the recording of broadcasts over the "free air waves" by the method disclosed in our co-pending patent application, Ser. No. 06/030,436. Television or radio programs, intended for recording rather than the listening or viewing audience, can be divided into a number of short program segments. Segments from various programs can be interspersed with one another and transmitted, for example, during the early morning hours when commercial stations would ordinarily be off the air. Each program segment can be accompanied by a coded signal. With a program code in its random access memory the present apparatus will then activate, deactivate and otherwise control a recorder to as to record all the individual program segments in a desired sequence to provide one continuous recording of the program.

The invention as described thus far provides a signal for enabling recording means whenever recording of the transmitted program has been authorized. It is yet another aspect of the invention that the apparatus may be used to actuate receiving means, display means, descrambling means or other means for enabling the reception and display of informational 37 programs", such as reports, data compilations, or individual documents. In this way the invention can be applied to control the access of a viewing audience to privileged information, whether that information is to be recorded or not.

For a further understanding and appreciation of the nature and advantages of the invention, reference should be made to the remaining portions of the specification and to the attached drawings.

BRIEF DESCRIPTION OF THE DRAWINGS

FIG. 1 is a block diagram of apparatus constructed according to a preferred embodiment of the invention.

FIG. 2 is a schematic diagram of an embodiment of the code-sensing means, wherein:

Subunit 2A is a schematic diagram of an isolating circuit;

Subunit 2B is a schematic diagram of an active filter; and

Subunit 2C is a schematic diagram of a zero crossing detector.

DETAILED DESCRIPTION OF THE PREFERRED EMBODIMENTS

The apparatus of the present invention is used in connection with a coded signal which is transmitted shortly before or along with a program to be recorded. The signal can be encoded in either analog or digital form and carries information concerning the program, as described more fully below. The signal will generally be carried along with the transmission in a manner not readily perceivable by a user receiving the program, so as not to interfere with the user's enjoyment thereof. Means for encoding and adding such a signal to a program transmission are well known; for example, the signal may be transmitted by a modulated subcarrier or, in the case of a television broadcast, transmitted in an otherwise unused line in the vertical field-blanking interval.

Apparatus constructed according to the invention includes logic means, designated generally at 10, code-sensing means, designated generally at 12, and means 13 for storing a code supplied by a user and indicating the user's program selection as well as any needed authorization to record any copyrighted or otherwise privileged material.

In a preferred embodiment, illustrated in FIG. 1, logic means 10 includes microprocessor 15, clock 16, and read only memory (ROM) 17. The ROM typically comprises two 1K Intel 2708 circuits. The Zilog Z-80 microprocessor has been found suitable for use in the present invention. The flow of information between the microprocessor central processing unit 15 and its associated memories 13 and 17 is effected in a conventional manner by data bus 18, data address bus 19, control line 20 for controlling storage and retrieval operations in random access memory (RAM) 13, and demultiplexer 21 for addressing the memories.

In a preferred embodiment a program transmission is accompanied by an audio-frequency signal bearing the coded information. This signal is detected in the received transmission by conventional means and then passed to code-sensing means 12. In this embodiment code-sensing means 12 includes audio decoder 22 for sensing the code amidst the audio-frequency signal applied to input 23.

A suitable decoder for this purpose is shown in FIG. 2. Subunit 2A includes DC blocking capacitor 24 and voltage-limiting diodes 26 to isolate and protect the subsequent circuitry from harmful spikes from the signal source. Subunit 2B illustrates an active, Salton-Key filter used here to greatly reduce or remove all frequencies above those used to encode the program data. Subunit 2C illustrates a zero-crossing detector. This detector includes voltage comparator 27, which is biased to provide a five volt output signal each time the incoming signal applied to input 23 rises through zero volts. A DC blocking capacitor 28 separates the zero-crossing detector circuit of subunit 2C from the Salton-Key filter of subunit 2B.

Audio-decoder 22 senses the decoded message and passes the code to buffer 31, where it is held momentarily until delivered to microprocessor 15 over data bus 32. In a preferred embodiment buffer 31 is a Signetics three-state octal buffer model 74244.

The sensed code provided to microprocessor 15 over data bus 32 is compared with the contents of random access memory 13. In the preferred embodiment RAM 13 is an MK4118A. If the sensed code does not indicate that the transmission is copyrighted or otherwise privileged, and if an order for the broadcast program has been placed in random access memory 13, then microprocessor 15 provides a signal for enabling the recording means. If the sensed code indicates that the transmitted program is copyrighted, then microprocessor 15 will only provide the enabling signal when the preselected program order in random access memory 13 includes an authorization code. That is to say, microprocessor 15 will provide a signal for enabling the recording means only when the sensed code from data bus 32 and the stored code from random access memory 13 conjointly indicate that the recording is authorized.

In one embodiment the transmitted code contains information identifying the length of the following segment. The microprocessor, in response to this code, sets a clock as a timer which will turn off the relay 38 at the end of the segment. Thus, there is no need for a shut-off code, and no code will be audible on the resulting recording.

Microprocessor 15 provides the enabling signal, when called for, through latch 35, for example a Signetics octal latch 74373, which is controlled by demultiplexer 36, a 1 of 4 type 745139. The output signal from latch 35 is boosted by drive amplifier 37 and used to actuate the recording means; alternatively, it may actuate means for receiving and displaying an informational program. For example, the output signal from amplifier 37 can be used to close relay 38, which may switch on the power to the recording means or may release its pause control.

The apparatus of FIG. 1 includes keyboard 40 with which the user can enter preselected program codes into random access memory 13 for storage. Keyboard 40 is conveniently connected through data bus 41 to buffer 31 where the coded data are held momentarily until they are fed to microprocessor 15 and random access memory 13. The keyboard is read with four bits provided over data bus 42 by latch 35 and four bits at buffer 31. The rows at keyboard 40 are indexed seriatim by latch 35; if a key in an indexed row is depressed, the corresponding column bit is presented to buffer 31 and then to data bus 32.

The apparatus may also conveniently include display means 43, such as an array of light-emitting diodes, for displaying and verifying the data entered into random access memory 13. Provided with such display means, the apparatus can be called upon through keyboard commands to identify the programs already recorded. Keyboard 40 and display means 43 are addressed by demultiplexer 36.

To prevent the situation where one user may obtain an authorization code from the program provider by rightful means and then pass the code on to others to use for unauthorized recording, a portion 45 of read only memory 17 may be used to store an apparatus-identifying code which is unique to the individual apparatus in which it is stored or which may be shared by a limited class of apparatus. This feature enables the microprocessor central processing unit 15 to verify that the rightful apparatus is being used to record the program.

This is accomplished in a preferred embodiment as follows. When the code accompanying a transmission is received and is sensed by means 12, the digits comprising the sensed coded message, or a portion of those digits, are intermixed and permuted with the digits of the apparatus-identifying code stored in ROM 17. The order in which the digits are intermixed and permuted is referred to herein as the encryption protocol and is determined by a set of instructions stored in ROM 17. Microprocessor 15 then compares the resulting coded sequence of intermixed and permuted digits with the contents of RAM 13. Relay 38 is activated only if the user has entered a matching code into RAM 13.

It is possible for a knowledgeable and skilled user to gain access to ROM 17 and determine the apparatus-identifying code and encryption protocol stored therein. For added protection against unauthorized recording by such a knowledgeable and skilled user, ROM 17 may hold a plurality of encryption protocols. In this case the code transmitted along with the program will indicate which encryption protocol is to be used for that particular broadcast. In this manner the encryption protocol may be selectively changed from time to time or even program to program to thwart even skilled attempts at unauthorized recording.

Alternatively, an apparatus-identifying code can be transmitted by the program provider intermixed along with the program identification and authorization code. A decryption protocol stored in ROM 17 can then be used to separate the apparatus-identifying code from the program-identifying and authorization code. The separated codes are then compared respectively with the apparatus code in ROM 17 and selection code in RAM 13. In this manner, the program provider can direct a particular program to be recorded by a particular identified apparatus or limited class of apparatus.

It may sometimes happen that a program provider will transmit the same program, for example a popular film, on many different occasions. Without further precautions, a user who obtains the program code including authorization to record would be able to use the same code repeatedly to make several recordings of the same film, although paying for only one recording. To circumvent this problem, the coded signal accompanying the broadcast may also indicate the date on which the program is provided. In this case, logic means 10 will provide an enabling signal only when the code which the user stores in memory 13 also indicates the same date. A user would have to purchase a separate dated program identification code for each date on which the film is broadcast.

It is of course possible that someone may attempt to override or bypass the control mechanism of the present apparatus, so as to record a desired program without purchasing the code therefor. With apparatus according to the present invention, however, a program provider may guard against this happening. The provider may include in the program identification code which accompanies the transmitted program an additional authorization-challenging code. When such a code is sensed by code-sensing means 12, logic means 10 verifies whether the sensed code and any other code in random access memory 13 taken together indicate the recording is authorized. For example, logic means 10 may cause a flag to be stored whenever it provides an enabling signal pursuant to an authorization code. A sensed authorization-challenging code will then cause logic means 10 to search for a stored flag. If in fact no flag is found, then logic means 10 provides a signal for disabling the recording means. This may be accomplished by merely terminating the enabling signal or by providing a separate disabling signal distinct from and overriding the enabling signal.

When read-only memory 17 includes an apparatus-identifying code in a portion 45 thereof, logic means 10 may alternatively respond to a sensed authorization-challenging code by comparing the apparatus-identifying code in portion 45 with the contents of random access memory 13 to verify that the program is being recorded in connection with the rightful apparatus.

As just described, logic means 10 disables the recording means when it discovers that a program is not being rightfully recorded. Alternatively, in response to unauthorized recording, microprocessor 15 can provide a signal for disabling itself by erasing read-only memory 17. This can be accomplished, for example, where read-only memory 17 is a fuse-linked programmable read only memory. In response to a failed authorization challenge, microprocessor 15 can apply a sufficiently high voltage to the programmable read only memory to blow the fuse links, thereby destroying the microprocessor control instructions stored therein.

A listing of control instructions for a Zilog Z-80 microprocessor for implementing the invention in the embodiment illustrated in FIG. 1 is attached hereto as Appendix A. The programmed instructions are written in an assembly language commonly used with the Zilog Z-80 microprocessor.

The invention is described herein in detail with respect to the recording of radio and television programs such as might be provided on a subscription basis by cable or other means. It will be appreciated, however, that the invention disclosed herein can be used for control of automatic recording in other diverse technical or commercial applications, such as transfers of proprietary technical data or inter-corporate transfers of privileged information. Moreover, apparatus according to the invention may be equally well adapted for use with other digital or analog transmission means, such as microwave, satellite, or fiber optics means, and with other types of recording means, such as holographic, video disc, or floppy disc recording means. Therefore, the above description and drawings should not be construed as limiting the scope of the invention, which is defined by the appended claims.

What is claimed is:

1. Apparatus for use with receiving means for enabling the receiving of programs desired by a user and authorized by a program provider, a program provided by said provider being accompanied by a program signal including a transmitted program identification code identifying the program and indicative of restricted authorization to receive said program if the program has restricted authorization, said apparatus comprising:

signal-sensing means for sensing the transmitted program identification code in said program signal;

input means for inputting a purchased program identification code which is different from the transmitted program identification code if the program has restricted authorization;

storage means for storing the input program identification code;

apparatus identification means for storing an apparatus identification code substantially uniquely indicative of the identity of the apparatus; and logic means connected to said signal-sensing means to receive the transmitted program identification code and connected to said storage means to receive the input program identification code stored therein, the logic means including comparison means which operates if the transmitted program identification code indicates that the program has restricted authorization to transform at least one of the input or transmitted program identification codes based on the apparatus identification code in a manner substantially unique to the apparatus for comparison of the uniquely transformed code to the other code, said logic means providing an enabling signal to said receiving means only when the authorization codes, subsequent to the unique transformation of one of them if the program has restricted authorization, conjointly indicate the receiving is authorized.

2. The apparatus of claim 1, said program being accompanied by a signal including an authorization-challenging code, wherein:

said logic means provides a signal for disabling said receiving means when said signal-sensing means senses said authorization-challenging code and said program identification codes do not conjointly indicate the receiving is authorized.

3. The apparatus of claim 1, wherein said transmitted program identification code is further indicative of the time period in which said program is provided; and said logic means provides said enabling signal only when said input program identification code is further indicative of said time period.

4. The apparatus of claim 1, wherein said logic means comprises a microprocessor.

5. The appratus of claim 4, wherein said signal-sensing means comprises:

an audio decoder adapted to receive an audio-frequency transmission accompanying the program and including the program signal, said decoder recognizing the program signal admist the audio-frequency transmission; and buffer means connected to said decoder at an output thereof for introducing the transmitted program identification signal to said microprocessor.

6. The apparatus of claim 5, wherein said buffer means comprises a semiconductor memory connected to said microprocessor and a keyboard connected to said buffer means for entering data into said memory.

7. Apparatus as in claim 1 wherein the program signal includes a protocol code, and wherein the logic means includes a plurality of transformation protocols and means for selecting the transformation protocol based upon the protocol code.

8. A method of controlling means for receiving a transmitted program desired by a user and authorized by a program provider comprising the steps of:
  transmitting a program signal accompanying the transmitted program, said signal including a transmitted program identification code which identifies the program and is indicative of restricted authorization to receive said program if the program has restricted authorization;
  receiving said transmitted program and accompanying program signal;
  electronically sensing said transmitted program identification code admist said transmitted program and accompanying program signal and determining if the program has restricted authorization;
  storing a purchased program identification code indicative of authorization to receive said program, the purchased program identification code being different from the transmitted program identification code if the program has restricted authorization;
  transforming at least one of the program identification codes based upon a stored code unique to the user's apparatus if the program has restricted access so that the transformed code is transformed in a manner substantially unique to the user's apparatus;
  comparing said program identification codes, subsequent to transforming if the program has restricted authorization; and
  providing an enabling signal only when said compared codes conjointly indicate that receiving is authorized, whereby said enabling signal enables the receiving means.

9. The method of claim 8 wherein said transmitting step includes transmitting a program signal including a protocol code, and wherein said transforming step includes utilizing a transforming protocol determined by the protocol code.

10. An apparatus for use with a receiving means for enabling the receiving of programs desired by the user and authorized by a program provider, a program provided by said provider being accompanied by a program signal including a transmitted program identification code identifying the program and indicative of restrictive authorization to receive said program if the program has restricted authorization, and a transmitted protocol code indicative of the transformation protocol to be used, said apparatus comprising:
  signal-sensing means sensing the transmitted program identification code and the protocol code in said program signal;
  input means for inputting a purchased program identification code which is different from the transmitted program identification code if the program has restricted authorization;
  storage means for storing the input program identification code;
  apparatus identification means for storing an apparatus identification code, substantially uniquely indicative of the identity of the apparatus; and
  logic means connected to the signal-sensing means to receive the transmitted program identification code and connected to said storage means to receive the input program identification code stored therein, the logic means including comparison means which operates if the transmitted program identification code indicates that the program has restricted authorization to transform at least one of the input and transmitted program identification codes, using a transformation protocol dictated by the protocol code, based on the apparatus identification code in a manner substantially unique to the apparatus, for comparison of the uniquely transformed code to the other code, said logic means providing an enabling signal to said receiving means only when the program identification codes, subsequent to the unique transformation of one of them if the program has restricted authorization, conjointly indicate that receiving is authorized.

11. A method of controlling means for receiving a transmitted program desired by a user and authorized by a program provider comprising the steps of:
  transmitting a program signal accompanying the transmitted program said signal including a transmitted program identification code which is indicative of restricted authorization to receive said program if the program has restricted authorization and a protocol code;
  receiving said transmitted program and accompanying program signal;
  electronically sensing the transmitted program identification code and said protocol code amidst said transmitted program and accompanying program signal and determining if the program identification code indicates that the program has restricted authorization;
  storing a purchased program identification code indicative of authorization to receive said program, the purchased program identification code being different from the transmitted program identification code if the program has restricted authorization;
  transforming at least one of the program identification codes based upon a stored code unique to the user's apparatus utilizing a transformation protocol determined by the protocol code if the program has restricted authorization so that the transformed code is transformed in a manner substantially unique to the apparatus;
  comparing said program identification codes subsequent to transforming if the program has restricted authorization; and
  providing an enabling signal only when said compared codes conjointly indicate that receiving is authorized, whereby said enabling signal enables the receiving means.

* * * * *